United States Patent [19]

Brown

[11] Patent Number: 4,677,475
[45] Date of Patent: Jun. 30, 1987

[54] METHOD OF COUPLING IDENTIFICATION TABS TO MICROFICHE FOR USE IN MICROFICHE STORAGE AND RETRIEVAL DEVICES

[75] Inventor: Thomas E. Brown, Andover, Mass.

[73] Assignee: Wang Laboratories, Inc., Lowell, Mass.

[21] Appl. No.: 719,832

[22] Filed: Apr. 3, 1985

[51] Int. Cl.[4] .............................................. H04N 7/18
[52] U.S. Cl. ..................................... 358/102; 40/159; 353/120
[58] Field of Search ............ 358/102, 294; 353/26 R, 353/27 A, 120; 235/435; 40/124.2, 124.4, 158 B, 159, 2 R, 359, 360, 361, 378

[56] References Cited

U.S. PATENT DOCUMENTS 3,429,436 2/1969 Irasek ..................................... 40/378
4,380,776 4/1983 Smith et al. .......................... 358/102
4,415,934 11/1983 Konishi ............................... 358/102
4,515,451 5/1985 Benham, Jr. et al. ............... 353/120

Primary Examiner—Howard W. Britton
Assistant Examiner—John K. Peng
Attorney, Agent, or Firm—Michael H. Shanahan; Gregory P. Gadson; Kenneth L. Milik

[57] ABSTRACT

A microfiche punch unit and method are disclosed. The method and apparatus assure proper alignment between the images and the binary identification tabs attached to the edge of the microfiche. In the pre-tabbing stage the microfiche is punched to create reference holes which are measured from the image grids rather than the edge of the fiche. The microfiche is "registered" (checked for alignment) by aligning the images with reference lines on the punch unit prior to punching the reference holes. During the actual tabbing, the fiche is placed over pegs added to a prior art tabbing press, to secure the fiche. The method and apparatus are ideally used in a microfiche storage/retrieval unit, such as those which are part of a digital imaging process.

2 Claims, 5 Drawing Figures

METHOD OF COUPLING IDENTIFICATION TABS TO MICROFICHE FOR USE IN MICROFICHE STORAGE AND RETRIEVAL DEVICES

BACKGROUND OF THE INVENTION

This invention relates generally to a method and apparatus for microfiche tabbing, and more specifically to more accurately aligning the image grids of the fiche with the identification tab.

Many microfiche storage and retrieval units, such as those manufactured by Tera operate similar to photographic slide storage and retrieval units. Each fiche is stored at a separate location in a carousel. To select a particular fiche, the carousel is rotated until the fiche to be selected is in front of a removal device-- usually a mechanism which attaches to the tab and lifts the fiche away from the carousel.

Placing a tab on the edge of microfiche serves two main purposes: to provide a means for identifying each fiche in a group and distinguishing it from the others, and providing a rigid edge for the removal mechanism to attach. The tab, which is metallic, contains a pattern of cut-outs on its outer edge that represents a unique binary number. To select the desired fiche, a narrow surface, which is parallel to the identifying tabs, is magnetized according to the pattern of the identifying notches on the fiche. Only one microfiche in the group will match the magnetic pattern.

When the fiche is found the carousel stops to allow the removal mechanism to remove the desired fiche.

During the preparation of the fiche, it is placed in a tabbing press, and the tab is aligned with the edge of the fiche. Afterwards the fiche is usually placed on a registration block to assure that the edge of the tab is parallel to the image grids. Nonalignment generally results in loss of portions of images during viewing. In the case of nonalignment the fiche must sometimes be re-tabbed (if possible) or even dispensed with.

The prior art method of tabbing and registration usually does not discover misalignment until after the identifying tab is attached, which often results in a waste of time and materials. Additionally, the distance varies from fiche to fiche, and the grids are not always parallel to the edge of the fiche.

SUMMARY

Accordingly, it is a principal object of this invention to devise a method of preparing microfiche for tabbing so that better alignment between the tabs and the image grids is achieved.

It is also a main object of this invention to "register" the microfiche prior to tabbing to avoid unnecessary time and material involved in tabbing for the case of misalignment.

Another object is to combine the preparation and registration steps prior to actual tabbing.

Yet another object of this invention is to combine the foregoing objects with a microfiche storage and retrieval device used in a digital imaging process.

The foregoing and other objects of the present invention are realized by causing reference points to to placed at a location measured from the image grids and using the reference points during the actual tabbing. The reference holes are punched and the fiche is registered by the same device, and at the same time.

DESCRIPTION OF THE DRAWINGS

The foregoing and other objects and features of the present invention are apparent from the specification, the drawings and the two taken together. The drawings are.

THE DESCRIPTION

Figure 1:
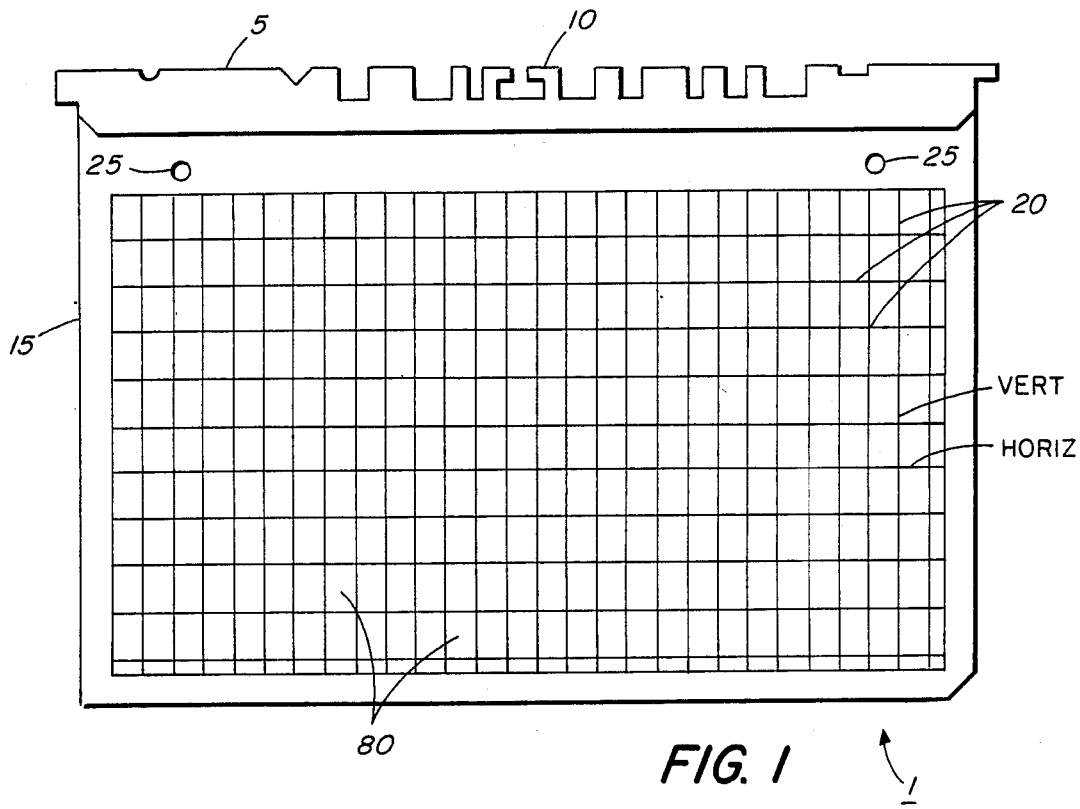
FIG. 1 is an illustration of a sheet of microfiche which has undergone the complete tabbing process.

FIG. 1 illustrates an example of a microfiche 1, such as is used in conjunction with the present invention. The microfiche 1 has an identification tab 5 attached, which contains slots or grooves representing a unique binary number. The affixation of the tab 5 allows the microfiche 1 to be used in the microfiche carousel 125 in FIG. 5, as will be more fully described later.

A problem in the prior art has been attaching the identification tab so that it is aligned with the image grids 20, within which the actual images 80 are to be read from the microfiche. The present invention enters guide holes 25, to serve both as references and anchoring means during the attachment of the sheet 15 to the identification tab 5.

Figure 2:
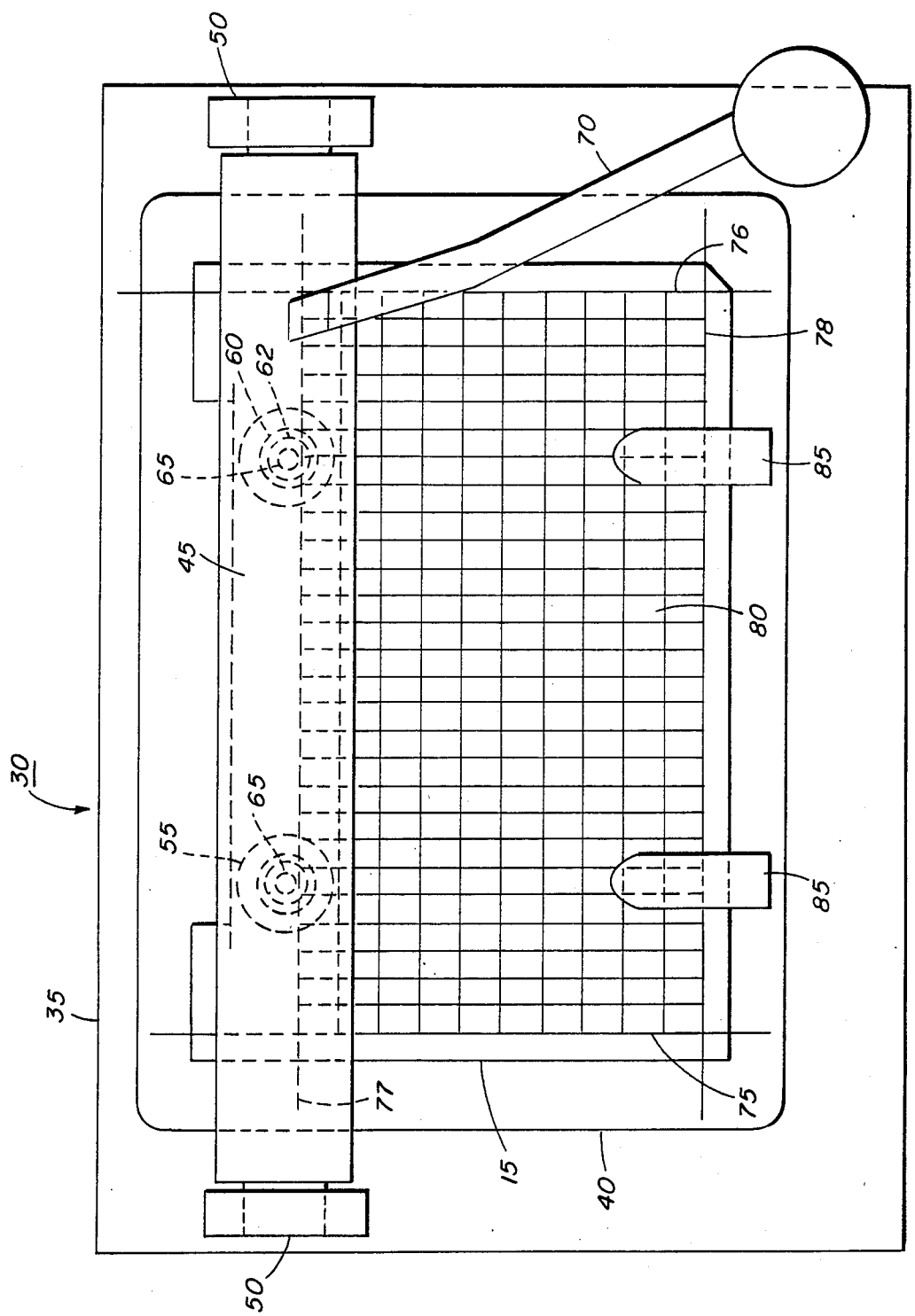
FIG. 2 is an illustration of the punch and registration unit.

Referring to FIG. 2, before attachment of the identification tab 5 takes place, the microfiche 1 is placed in position on microfiche punch unit 30. The major components of the unit are the base 35, plate 40 (plexiglas in the preferred embodiment), cam 45, and hole punch 65 (two places). In operation, microfiche sheet 15 is placed on top of plate 40, and held in place by clips 85. The image grids 20 are aligned with the four scribe lines 75-78. Scribe lines 75 and 76 are a pair of vertical lines, and lines 77 and 78 are a pair of horizontal lines which are used for reference. In practice, the four imaginary grid lines, which form the outer boundary of all microfiche images 80, are matched with the corresponding scribe lines 75-78.

Sheet 15 is now ready to have holes 25 punched into it. Holes 25 serve as means through which the sheet 15 can be anchored during the attachment of the identification tab 5. The preferred embodiment uses two guide holes inserted near the top of the microfiche. The holes are located (as seen FIG. 2) such that an imaginary line drawn through the center of each hole is parallel to the uppermost horizontal scribe line 77.

A pair of hole punches 65 (FIG. 2) makes the actual holes 25 (FIG. 1). Holes punches 65 may only move in paths perpendicular to the plane of sheet 15 and are located on microfiche punch unit 30 such that an imaginary line drawn through the cylindrical center of each hole punch is parallel to the horizontal grids 20. Hole punch 65 is part of a unit that includes bushing block 60, thrust washer 55, and a spring 62. Thrust washer 55 is attached towards the end of hole punch 65. Then hole punch 65 is inserted through spring 62, and bushing block 60, which is located just above sheet 15. When a holes are being punched thrust washer 55 pushes spring 62 down during insertion of the holes by hole punch 55, and returns hole punch 55 to its starting position by the resilient force of spring 62 afterwards.

After the microfiche sheet 15 is correctly placed on plate 40 and secured by clips 85, two holes are punched in the following manner: cam 45, attached to ends 50, is rotated by applying a downward force to arm 70; during the rotation of cam 45, punch pins 65 enter holes in sheet 15. Thus microfiche sheet 15 now has reference holes 25, which are equidistant from the horizontal image grids 20 of sheet 15, and are used to insure proper alignment between tab 5 and the images 80.

Figure 3:
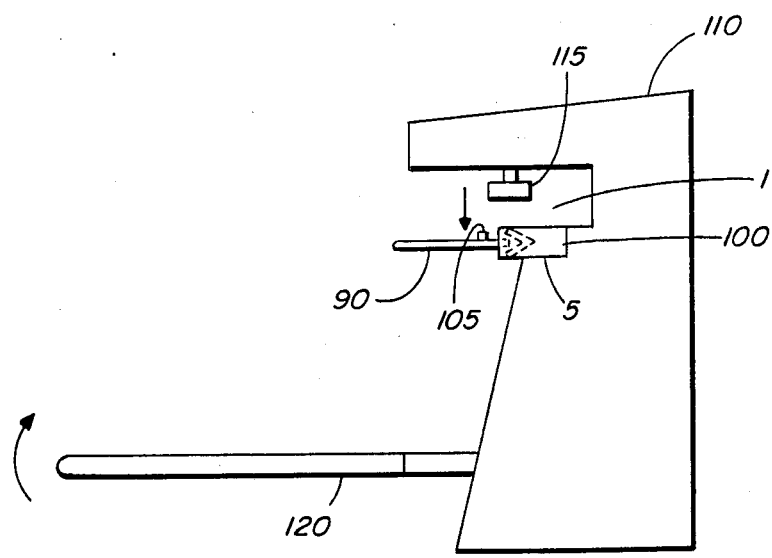
FIG. 3 is a side view of the tabbing press used to attach identification tabs to microfiche.
Figure 4:
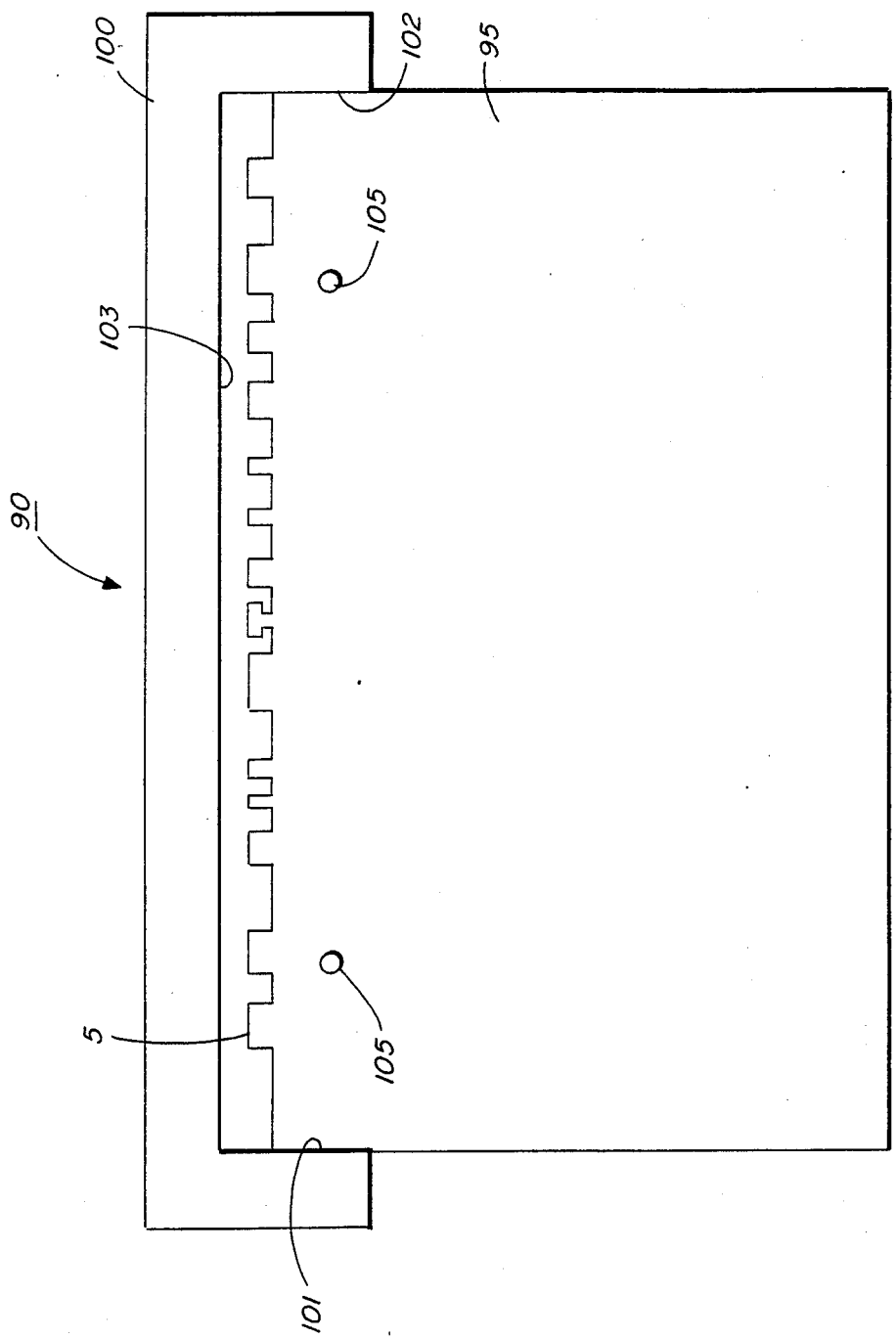
FIG. 4 illustrates the components of a special device added to the tabbing press in FIG. 3 to accurately secure the microfiche during the tabbing process.

FIG. 3 shows a side view of a tabbing press 110, used to attach tab 5 to sheet 15. Holes 25 of sheet 15 are inserted with posts (or pegs) 105, which are affixed to tabbing plate 90. FIG. 4 shows an enlarged illustration of the tabbing plate 90. It is comprised of plate 95 and guide wall 100. Guide wall or restraining means 100, which surrounds the tab 5 on three sides has one horizontal component and two vertical components. The vertical components, 101 and 102 of wall 100, maintain vertical alignment between the ends of the tab and sheet 15 by preventing horizontal movement of tab 5 during the attachment process. The horizontal component 103 of wall 100 fixes a vertical boundary for tab 5.

Prior to attaching the identification tab 5 the tab is placed between pegs 105 and guide wall 100. Sheet 15 is between the edges of tab 5 and secured by pegs 5, while resting on plate 95. The horizontal image grids are now parallel to the upper edge of tab 5. Lever 120 is rotated to move press 115, until tab 5 is completely folded around the edge of sheet 15. Sheet 15 now has an identification tab 5 attached which is aligned with, or parallel to the horizontal image grids 20. Microfiche 1 is now ready for use, such as is illustrated in FIG. 5.

Figure 5:
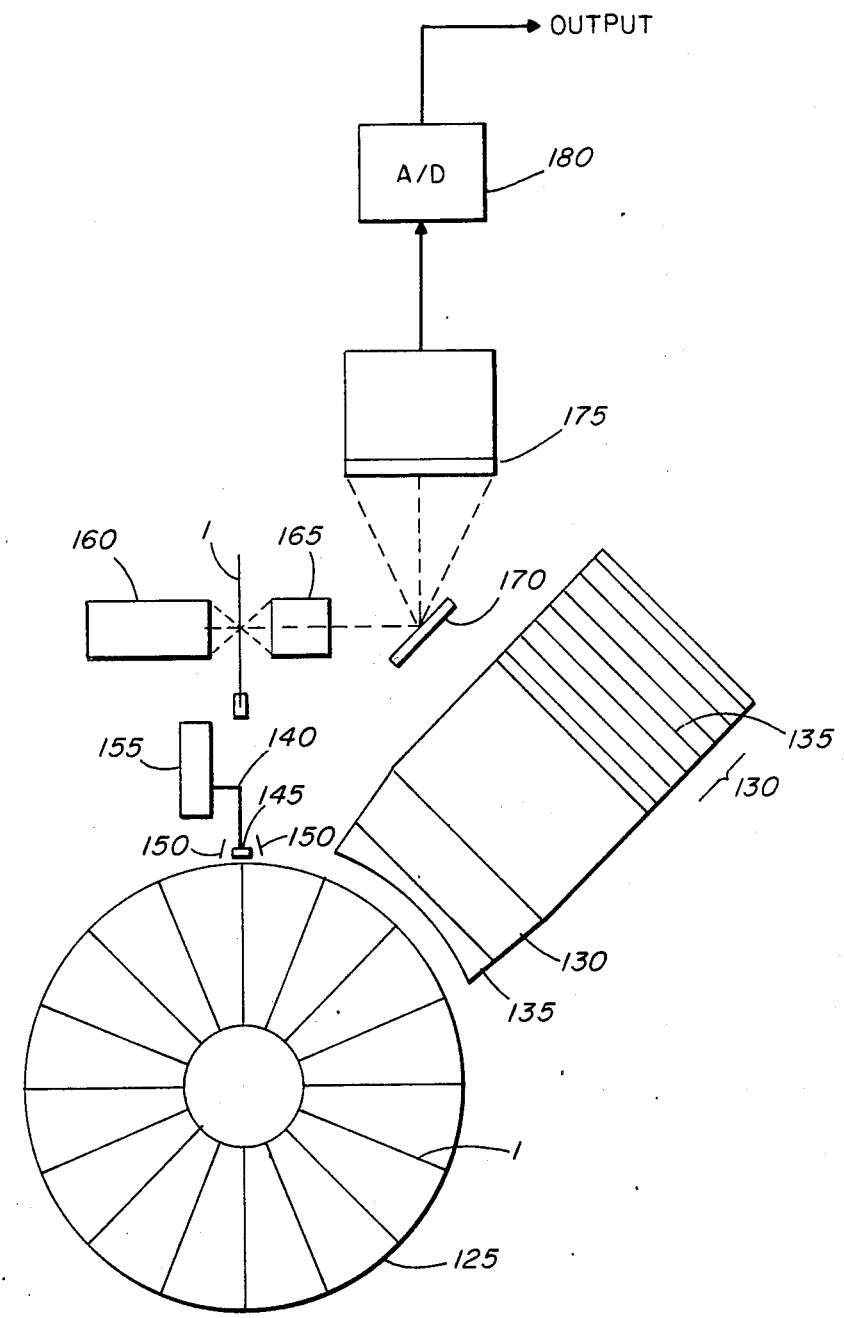
FIG. 5 shows a microfiche storage and retrieval unit used in a digital imaging process.

FIG. 5 shows a microfiche retrieval and storage unit used in the process of digitizing the images on microfiche 1 to be transferred for viewing, etc., in a digital imaging system. The microfiche are placed on carousel 125, which can be rotated to any desired location. Solenoid 130 contains magnetic plates 135 that protrude it according to the unique pattern of gaps in the identification tab 5 of microfiche 1. The carousel is rotated until the microfiche having a tab with the desired pattern is located or matched with the pattern of magnetic plates 135.

The desired microfiche automatically stops in front of retrieval arm 140. Separators 150 separate all other microfiche from the desired microfiche, while grabber foot 145 (attached to retrieval arm 140) is inserted into notch 10 (see FIG. 1). Retrieval arm 140 removes microfiche 1 from the carousel 125, and is guided by X-Y coordinate device 155, which controls the vertical and horizontal displacement of the retrieval arm 140.

Microfiche 1 is then placed in the path of light source 160. As the light shines through the microfiche it is focused by lens 165 and deflected by mirror 170. The light then lands on charge-coupled device (CCD) 175, where the image is converted to analog electrical signals. Afterwards, the analog signals are converted to digital signals by analog-to-digital converter 180. The image may be viewed, edited, stored, or any combination of the aforementioned, as is desired by the operator.

I claim:

1. A method for coupling of identification tabs to microfiche comprising the steps of predetermining a distance measured from the edge of the images of said microfiche to locate at least one reference hole, entering at least one reference hole in said microfiche, and placing the reference holes over guide pegs to secure the microfiche during the coupling of the identification tab.

2. The method for coupling identification tabs of claim 1 further comprising the steps of placing said identification tab between said guide pegs and a restraining means which prevents horizontal movement of said identification tab and restricts vertical movement of said identification tab, inserting said guide pegs through the reference holes in said microfiche, inserting an edge of said microfiche between the edges of said identification tab while said guide pegs are inserted in the holes in said microfiche, and folding said identification tab around said edge of said microfiche.

* * * * *